(12) United States Patent
Fridman

(10) Patent No.: US 6,186,708 B1
(45) Date of Patent: Feb. 13, 2001

(54) DRILL GUIDE AND METHOD FOR INSTALLING A DOOR LOCK

(76) Inventor: Yevgeny Fridman, 4235 Ranwick Ct., San Jose, CA (US) 95118

(*) Notice: Under 35 U.S.C. 154(b), the term of this patent shall be extended for 0 days.

(21) Appl. No.: 09/442,051

(22) Filed: Nov. 16, 1999

(51) Int. Cl.[7] .............................. B23B 35/00; B23B 49/02
(52) U.S. Cl. ............................ 408/1 R; 408/16; 408/79; 408/72 B
(58) Field of Search .................... 408/1 R, 16, 72 RB, 408/79, 97, 115 R, 241 B, 716, 115 B

(56) References Cited

U.S. PATENT DOCUMENTS

| | | | |
|---|---|---|---|
| 5,116,170 | * | 5/1992 | Palmer et al. ................ 408/72 B |
| 5,222,845 | * | 6/1993 | Goldstein et al. ............ 408/115 R |
| 5,915,891 | | 6/1999 | Fridman ........................ 408/1 R |

FOREIGN PATENT DOCUMENTS

677563 * 5/1991 (CH) ................................ 408/72 R

* cited by examiner

*Primary Examiner*—Steven C. Bishop
(74) *Attorney, Agent, or Firm*—Robert Samuel Smith

(57) ABSTRACT

A drill jig for installing a lockset in a hanging door with an aperture for the lockset. The drill jig has a plate with a plug on one side dimensioned to fit into the aperture. An array of drill bushings is mounted in the plate aligned with a level on the top edge of the plate. Rubber feet protect the the door from being marred by the plate. The plate is positioned against the door in preparation for drilling holes through the drill bushing into the door. A tool is provided having a tee hook which is inserted through the door aperture from a side of the door opposite the drill jig and temporarily secures the drill jig against the door during the drilling operation.

11 Claims, 2 Drawing Sheets

1. Provide drill jig
2. Position drill jig
3. Orient drill jig
4. Drill holes
5. Insert lockset

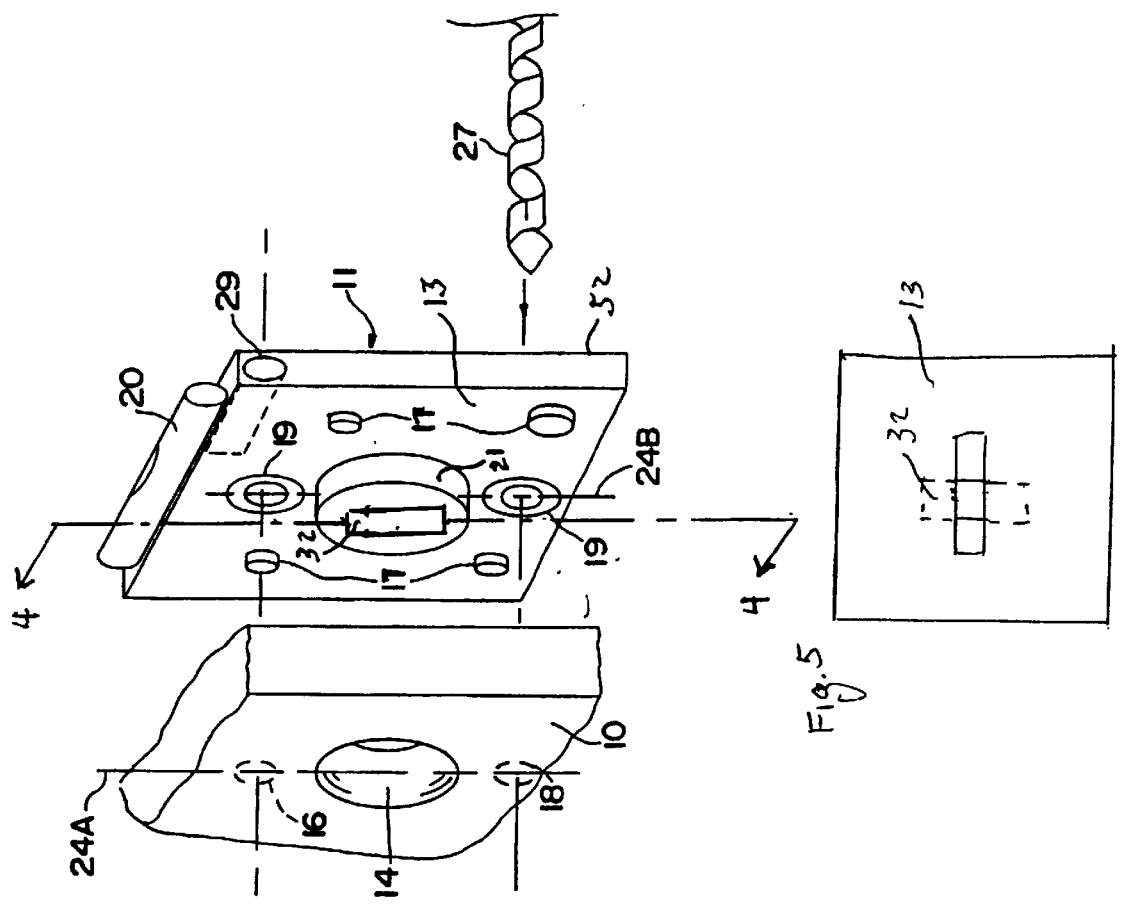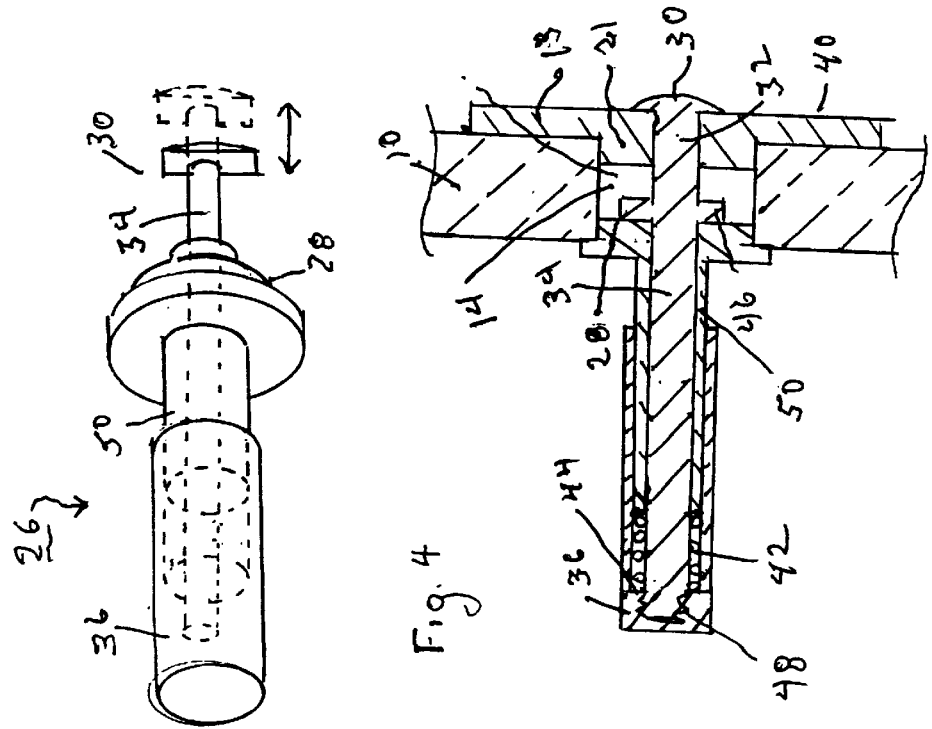

DRILL GUIDE AND METHOD FOR INSTALLING A DOOR LOCK

FIELD OF THE INVENTION

This invention relates to a drill guide for use in installing a lock into a door and particularly to a drill guide that uses a level to align the drill guides used to secure the lock in the door.

PRIOR ART AND INFORMATION DISCLOSURE

Common procedure for a builder to install a door is to order a door panel that has a standard size aperture (hole through the door) for receiving the lockset. The aperture is typically located near one long edge of the door 36 inches from the bottom edge. The aperture typically has a two inch diameter selected to receive the common lock set. Installation of the drill set requires that a pattern of holes be drilled by the carpenter in the door proximal to the two inch hole through which bolts are inserted to secure the lock set. The position and size of the smaller holes varies according to the lockset selected by the builder.

Alignment of the holes with the edge of the door is very critical for the sake of appearance as well as for ease of installation of the lockset. Consequently, some rather elaborate drill jigs have been disclosed that are available along with the lockset as aids in installing the doors. Such aids are particularly useful when large numbers of doors are being installed such as when erecting large tracts of residences.

The drill jigs of the prior art are typically plates holding an array of drill bushings. In a common jig, a shoulder is positioned along one edge of the plate. The plate is positioned on the door to be drilled with the shoulder abutting an edge of the door. In this manner, the holes to be drilled are aligned with the edge of the door. This arrangement is only satisfactory when all of the doors have their apertures located at the same distance from the edge of the door.

In another arrangement, the jig is a channel that straddles the edge of the door with one leg (plate) of the channel on each side of the door. Each plate has an array of drill bushings, each bushing aligned with a bushing in the other plate. This arrangement is satisfactory only when all of the doors have the same thickness.

For example, U.S. Pat. No. 5,116,170 to Palmer et al discloses a drill jig for installing a lockset with a flange for attaching a C-clamp.

U.S. Pat. No. 5,479,802 to Miller discloses a method of installing a combination lock deadbolt assembly with a dial lock.

U.S. Pat. No. 5,915,891 to Fridman shows a drill jig for installing a lockset in a door.

SUMMARY

In view of the problems posed by a requirement to install locksets in doors wherein each door may have any one of a range of thicknesses and aperture locations, it is desirable to provide a drill jig for drilling an array of holes in a hanging door wherein the array of holes can be in various locations and the thickness can be in a range of thicknesses.

This invention is directed toward a plate having mounted on one side a locating disk that fits snugly into the aperture of a door when the plate is laid against the surface of the door. An array of drill bushings is mounted in the plate at required locations relative to the aperture. At least three rubber (bumper) feet are mounted on the side of the disk having the guide disk which protect the door against scratching by the drill jig. A level is mounted on one edge of the plate in view of the carpenter installing the lockset so that when the carpenter inserts the disk into the aperture in the door, he may adjust the orientation of the plate so that the bubble in the level indicates that the level and the edge on which the level is supported is horizontal. When the level is horizontal, the array of drill bushings in the plate is square with the horizontal plane. To hold the jig plate against the door during drilling, a tool pressed against the side of the door opposite the drill jig has a teehook extending through the door aperture and hooks the far side of the jig plate.

BRIEF DESCRIPTION OF THE DRAWINGS

FIG. 3 shows the tool and jig plate poised for attachment to the door.

FIG. 4 is a sectional view of the device of FIG. 3 in an assembled state.

FIG. 5 shows the drill plate of FIG. 1 with a modified aperture.

DESCRIPTION OF AN ILLUSTRATIVE MODE

Figures 1, 2:
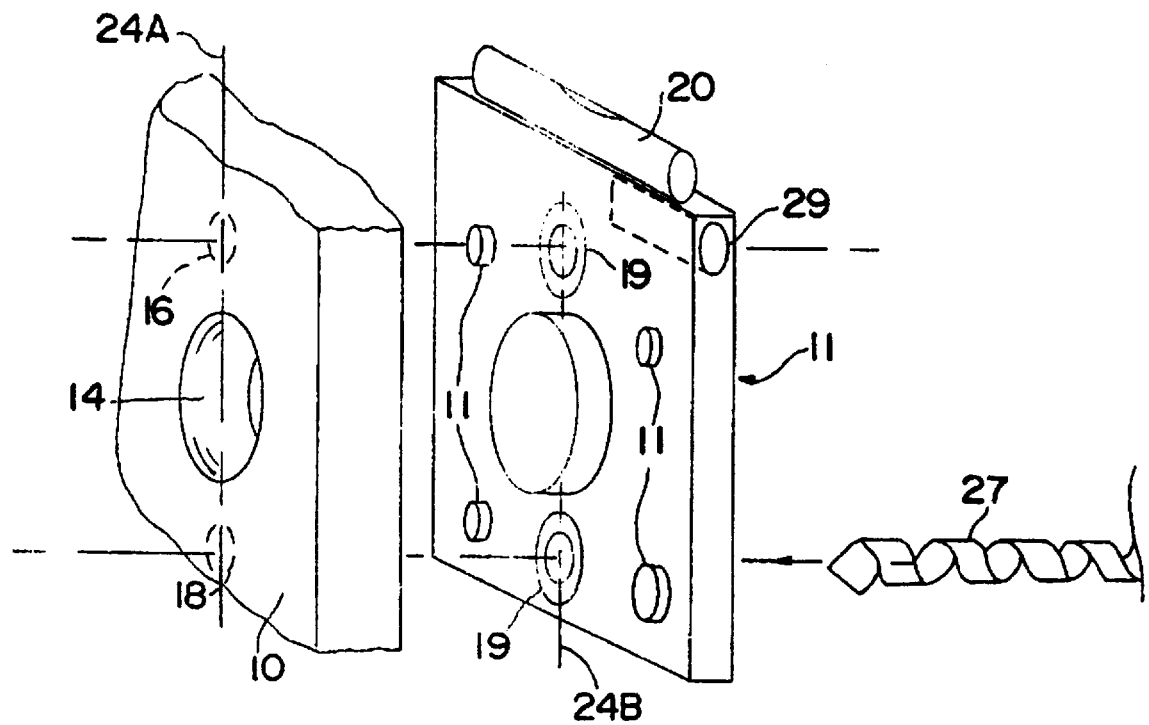
FIG. 1 shows a door panel hung and prepared for installing a lockset.
FIG. 2 shows steps for installing a lockset according to the invention.

Turning now to a discussion of the drawings, FIG. 1 shows a door panel 10 (partially cutaway) hung in a doorway in preparation for installing the lockset The lockset is not shown in FIG. 1. The door panel 10 has been received with a two inch door aperture 14 located at a distance from the edge of the door panel 10 that depends on the lockset to be installed.

In order to install the lockset, it is necessary to drill two holes at locations 16, 18, (in phantom) into the door. It is desirable that the centerline 24A through the holes be vertical and necessary that the two hole locations 16, 18 be accurately positioned with respect to the aperture 14.

The drill jig 11 of the prior art is also shown in FIG. 1 and includes a jig plate 13 with a jig plug 21 on one surface dimensioned to fit into door aperture 14. There is also shown a bubble level 20 on the top edge of the plate 13. An array of drill bushings 19 (two are shown in FIG. 1) are mounted in the plate 13 and having a reference line 24B positioned with respect to the level 20 to be vertical when the level 20 is horizontal. Rubber feet 17 on the jig plate 13 protect the door surface from marring when the surface of the drill jig 11 is against the door in preparation for drilling with drill 27.

Steps in the method for performing the installation are listed in FIG. 2.

The first step is to provide a drill jig 11 of the prior art shown in FIG. 1 comprising a (preferably) square plate 13 having a round plug 21 on one side. The side also has at least three rubber feet 17 so that the plate 13 will not mar the door panel 10 when the plug 21 is inserted into the aperture 14. Drill bushings 19 corresponding to holes 16 18 to be drilled into the door panel 10 are also shown. A bubble level 20 is positioned along a "top" edge of the plate 13 in view of the carpenter installing the lockset.

In the second step, the drill jig is positioned against the door panel 10 with the round plug 21 inserted into the aperture 14 and the rubber feet 17 against the door surface.

In step 3, the jig is oriented so that bubble level 20 indicates that the edge 22 is horizontal and, therefore, the centerline 24 of the drill bushings 19 are vertical.

In step 4, the holes 16, 18 are drilled in the door panel 10 through the drill bushings 19.

In step 5, the jig 11 is removed and the lockset is placed in the door panel 10, and bolted in position through the drilled holes.

FIG. 3 is a perspective view showing the invention which enables the workman to apply a tool 26 to firmly secure the jig 11 to the door for the drilling operations and then remove the jig 11 from the door 10. FIG. 4 is a sectional view along line of sight 4 (FIG. 3) with the jig assembled to the door. There are shown jig plate 13 poised for positioning against one side of the door 10 with the plug 21 inserted in the door aperture 14 in door 10. A tool 26 is poised for positioning against the opposite side of the door 10 with a tool plug 28 inserted in the door aperture 14. A "tee hook" 30 mounted on a stem 34 extends from the handle 36 of tool 26 through the door hole 14 and through a slot aperture 32 in the plug 21. When the tee hook 30 is rotated by rotating the tool handle 36, the tee hook 30 hooks the opposite surface 40 of the jig plate 13 The tee hook 30 is spring loaded by spring 42 to pull the jig plate 13 firmly against the door 19 as required for the drilling operation. The spring 42 is retained the bottom surface 44 of recess in handle 36 and a collar 46 on stem 34. The threaded end 48 of stem 34 opposite the tee hook screws into the threaded recessed bore of the cylindrical handle. The tool plug is shown having a shoulder dimensioned for insertion into the door hole opposite the jig hole. The tool plug 28 is securely integrally mounted on the end of a cylinder 50 that telescopes into the recess of handle and butts against spring in the recess.

In use, the workman positions the jig plate 13 against one side of the door 10 with the jig plug 21 inserted in the door aperture 14. The tool plug 28 is positioned in the door aperture A 14. The handle 36 is pushed against the door 10 to compress spring 42 and push the tee hook 30 through the slotted aperture 32. The the handle 36 is rotated so that the tee hook 30 is oriented to hook the jig plate 13 thereby engaging the far surface of the jig plate 13 opposite the door 10.

FIG. 5 shows the far side 52 of jig plate 13 illustrating another modification. There is shown a groove formed in the farside of the drill plate by which the tee hook is temporarily retained to prevent accidentally dislodging the tee hook. during the drilling operation.

In view of these and any other modifications within the scope of the invention, I therefore wish to define the scope of my invention by the appended claims.

I claim:

1. A drill jig for installing a doorset into a door panel having a door aperture dimensioned to receive said door set, said door having one side opposite an opposite side, said drill jig comprising:
    a jig plate;
    an array of drill guide holes in said jig plate in a pattern selected to correspond to an array of holes to be drilled in said door through each one of said array of drill guide holes;
    a jig plug mounted on one side of said jig plate for positioning said jig plate against a surface of one side of the door with said jig plug dimensioned to fit snugly inside the door aperture;
    said jig plug having a slotted aperture with an opening on each side of said jig plate;
    a tool having a tee hook and operably constructed to permit placing said tool against said opposite side of said door and inserting said tee hook through said jig plug inserted in the door aperture from the one side of the door.

2. The drill jig of claim 2 wherein said tool comprises:
    a stem having said teehook mounted on one end;
    a handle secured to another end of said stem;
    a tool plug operably dimensioned to fit in said door aperture and having a tool aperture;
    said stem slidably positioned in said tool aperture;
    said stem, tee hook, handle, and tool plug operably arranged to permit placing said jig plate against said one side of said door with said jig plug inserted in the door aperture, and placing said tool against the opposite side of the door with said tool plug inserted in said door aperture and said stem inserted through said door aperture and slotted aperture and, further, permitting engagement of said tee hook with a far side of said jig plate whereby said jig plate is secured in a position to permit drilling holes in the door through said array of drill guide holes.

3. The drill jig of claim 2 further comprising a spring means operably arranged in combination with said handle and said tool plug to spring bias said tool plug toward said tee hook.

4. The drill jig of claim 1 further comprising:
    a bubble level mounted on said jig plate for guiding a user to orient said jig plate with said jig plug in said jig aperture;
    said level oriented with respect to said array to provide that, when said jig plug is in said aperture and said bubble level is horizontal, a reference line of said array is vertical enabling a user to mount said drill jig on said door with said plug inserted in said aperture, orient said drill jig to where said reference line is vertical and drill holes in said door panel through each said bushing of said array of bushings.

5. The drill jig of claim 1 comprising means adapted for storing a drill bit used to drill holes through the door.

6. The drill jig of claim 1 wherein said jig plate has a rectangular shape with a top edge, a bottom edge and two side edges.

7. The drill jig of claim 2 wherein said bubble level is a tube mounted on said top edge with an axis of said tube parallel to said top edge.

8. The drill jig of claim 1 wherein said drill guide holes formed in said jig plate comprises hardened drill bushings pressed into holes in said plate.

9. The drill jig of claim 5 wherein said jig plate is made of a material selected from a group of materials that consists of aluminum alloy, steel alloy and plastic.

10. The drill jig of claim 5 wherein said jig plate is a hardened steel plate.

11. A method for installing a lockset in a hanging door having one side and a far side and having a door aperture dimensioned for receiving said lockset which includes the steps in operable order:
    (a) providing a drill jig including:
        (i) a jig plate;
        (ii) a jig plug mounted on one side of said jig plate for positioning said jig plate against a surface of the one side of the door with said jig plug dimensioned to fit snugly inside the door aperture;
        (iii) an array of drill guide holes in said jig plate in a pattern selected to correspond to an array of holes to be drilled in the door through each one of said array of drill guide holes;

(iv) a bubble level means mounted on said jig plate for guiding a user to orient said jig plate with said jig plug in said door aperture;

(v) said level oriented with respect to said array to provide that, when said jig plug is in the door aperture and said bubble level is horizontal, a reference line of said array is vertical enabling a user to mount said drill jig on the door with said jig plug inserted in the door aperture, orient said drill jig to where said reference line is vertical and drill holes in the door through each said bushing of said array of bushings;

(vi) at least three rubber feet means positioned on said one surface of said jig plate for protecting said surface on one side of the door from marring by said drill jig;

(vii) a tool having a tee hook and arranged for positioning against the opposite side of the door with said tee hook extending through the door aperture and engaging a side of said jig plate opposite said jig plug whereby said jig plate is securable against said one side of the door for drilling an array of holes in the door;

(b) positioning said jig plate against said door with said plug positioned in said aperture of said door;

(c) orienting said jig plate to where said bubble level is horizontal;

(d) temporarily securing said jig plate against said door with said tool;

(e) drilling holes in said door through said each drill guide hole;

(f) removing said tool and drill jig and mounting said lockset in said door and bolting said lockset with a bolt in each hole of said array of holes.

* * * * *